United States Patent [19]
Kunzler et al.

[11] Patent Number: 5,824,719
[45] Date of Patent: Oct. 20, 1998

[54] POLYMER COMPOSITIONS FOR CONTACT LENSES

[75] Inventors: Jay F. Kunzler, Canandaigua; Mahendra P. Nandu, Rochester, both of N.Y.

[73] Assignee: Bausch & Lomb Incorporated, Rochester, N.Y.

[21] Appl. No.: 482,063

[22] Filed: Jun. 7, 1995

[51] Int. Cl.⁶ ............................... G02C 7/06; C08F 32/00
[52] U.S. Cl. ..................... 523/106; 351/160 H; 526/320; 526/325
[58] Field of Search ........................ 523/106; 351/160 H; 526/320, 325

[56] References Cited

U.S. PATENT DOCUMENTS

| | | | |
|---|---|---|---|
| 3,402,153 | 9/1968 | Jaeger et al. | 526/320 |
| 5,006,622 | 4/1991 | Kunzler et al. | 526/309 |
| 5,236,969 | 8/1993 | Kunzler et al. | 523/108 |
| 5,270,418 | 12/1993 | Kunzler et al. | 526/309 |
| 5,298,533 | 3/1994 | Nandu et al. | 523/106 |
| 5,310,779 | 5/1994 | Lai | 524/588 |
| 5,352,714 | 10/1994 | Lai et al. | 523/107 |
| 5,422,395 | 6/1995 | Ooura et al. | 526/320 |

*Primary Examiner*—Andrew E. C. Merriam
*Attorney, Agent, or Firm*—John E. Thomas; Craig E. Larson

[57] ABSTRACT

An improved hydrogel formed from hydrated polymerization products of monomer mixtures containing a major amount of at least one hydrophilic monomer and a strengthening monomer wherein the strengthening monomer is 2-hydroxycyclohexyl methacrylate. Contact lenses made from the hydrogels are also disclosed.

37 Claims, No Drawings

POLYMER COMPOSITIONS FOR CONTACT LENSES

BACKGROUND OF THE INVENTION

1. Field of the Invention

This invention relates to copolymers and hydrogels useful as contact lens materials. This invention also relates to hydrogel shaped articles, preferably contact lenses, which are made from hydrated polymerization products of monomer mixtures containing a major amount of at least one hydrophilic monomer and a strengthening monomer.

2. Description of the Related Art

The use of hydrogels to make contact lenses has been known, since at least as early as Wichterle, et al., U.S. Pat. No. 3,220,960 which discloses hydrogels involving a hydrated polymer of an hydroxyalkyl acrylate or methacrylate crosslinked with a corresponding diester. Since then a variety of hydrogel materials have been developed, ranging from low-water hydrogels such as poly(2-hydroxyethyl methacrylate) with a water content of about 39% to mid-water hydrogels having a water content of about 40 to 60%, to high-water hydrogels having a water content of about 60 to 90%.

Examples of high-water hydrogels include poly(N-vinyl pyrrolidone) (NVP) or poly(N,N-dimethylacrylamide) (DMA). Homopolymers of DMA and NVP possess water contents in excess of 90%. In a copolymer system, the water content of a NVP or DMA based hydrogel can vary widely depending on the concentration of NVP or DMA. Higher concentrations of NVP or DMA result in a significant increase in water content. Most commercial hydrogels derived from NVP and DMA have a water content in the 70% to 80% range.

A desirable benefit of high water lenses is their higher oxygen permeability. This relates to the ability of the lens material to transport oxygen to the cornea of the eye. Oxygen permeability can be increased by increasing the water content. However, increasing water content undesirably affects other mechanical properties of the lens, such as decreasing the tensile and tear strength of the lens. Thus, a major drawback of high water content hydrogels is the cured copolymers are often fragile. During patient usage, high water lenses have a tendency to fold and frequently tear during handling.

One approach to solving these problems involves incorporating a "strengthening monomer", i.e. a monomer that improves the tensile and tear strength of the lens. U.S. Pat. Nos. 5,006,622, 5,236,969, 5,270,418 (Kunzler et al.) and 5,298,533 (Nandu et al.) disclose a class of strengthening hydrophobic monomers which can be copolymerized with hydrophilic monomers for hydrogel contact lenses. These strengthening monomers include: 4-t-butyl-2-hydroxycyclohexyl methacrylate (TBE); 4-t-butyl-2-hydroxycyclopentyl methacrylate; 4-t-butyl-2-hydroxycyclohexyl methacrylamide; 6-isopentyl-3-hydroxycyclohexyl methacrylate; and 2-isohexyl-5-hydroxycyclopentyl methacrylamide. The major drawback of these monomers, however, is that they are not commercially available. They require several synthetic steps in their preparation that significantly increase the cost of the resultant lens. While these strengthening monomers did adequately improve the physical parameters of high water lenses, it was the object of this invention to provide an alternate monomer that would also perform as a strengthener while either being commercially available or simple to synthesize, resulting in reduced cost per lens.

SUMMARY OF THE INVENTION

It has now been found that the mechanical properties of contact lens materials can be improved by the incorporation of 2-hydroxycyclohexyl methacrylate (2HCHM) as a strengthening agent in the monomer mixtures. Its inclusion effectively improves physical properties such as tear strength and tensile strength; it is compatible with the hydrophilic monomer; it is easy to synthesize; and the resultant copolymers provide optically clear hydrogels which exhibit a desired combination of properties including a relatively high water content and oxygen permeability, and hydrolytic stability.

The invention is broadly applicable to contact lens materials: hydrogels prepared from a monomer mixture employing 2HCHM and a hydrophilic monomer. The water content of the hydrogel is preferably within the range of about 40 to about 90%, more preferably within the range of about 50 to about 80% and still more preferably between about 55 to about 70%. The modulus is preferably in the range of about 20 to about 100 g/mm$^2$. Preferred hydrophilic monomers are N,N-dialkyl(meth)acrylamide, 2-hydroxyethyl methacrylate (HEMA), glyceryl methacrylate, and N-vinyl pyrrolidone (NVP).

As previously noted in U.S. Pat. No. 5,298,533, incorporation of a vinyl lactam, such as NVP, in the monomer mixture as the hydrophilic monomer can affect the processability of the monomeric mixture. The cure time is increased with heat generally required to complete the polymerization. Another difficulty arises from phase separation which can occur when vinyl lactams are admixed with monomers having (meth)acrylate or (meth)acrylamide functionality. It has been found that monomeric mixtures comprising hydrophilic and strengthening monomers of this invention can be cured effectively under ultraviolet light at room temperature and without encountering deleterious effects from phase separation of the monomers.

The copolymers of the present invention generally have a much lower modulus of elasticity than the copolymers disclosed in U.S. Pat. No. 5,006,622. This is very important in that materials of lower modulus generally exhibit improved comfort. Despite having the lower modulus of elasticity, the copolymers of this invention still exhibit sufficient mechanical strength due to the high tear strength. Without wishing to be bound by any particular theory of operability, the Applicant believes that the cyclohexyl group generates a more rigid polymer, improving the mechanical properties and the secondary hydroxyl group improves compatibility with hydrophilic monomers, reducing the occurrence of phase separation.

Another benefit of 2HCHM over the strengthening monomer of U.S. Pat. No. 5,006,622, 4-t-butyl-2-hydroxycyclohexyl methacrylate (TBE), is the ease of synthesis. 2HCHM is much easier to make than TBE requiring only one synthetic step, as compared to three for TBE. The starting material for 2HCM, cyclohexyl epoxide, is commercially available, dramatically reducing the synthetic and subsequent lens costs.

DETAILED DESCRIPTION OF THE INVENTION

A hydrogel is a hydrated crosslinked polymeric system that contains water in an equilibrium state. The physical properties of hydrogels can vary widely and are mostly determined by their water content. Hydrogels may contain 10% to 90% water by weight and exhibit excellent biocompatibility and as such are used for soft biomedical applications. Commercial success for hydrogels has been found in the field of ophthalmology, most particularly as contact lenses.

Conventional hydrogel contact lenses are prepared by polymerizing a monomer mixture containing at least one hydrophilic monomer. The term "hydrophilic monomer" as used here denotes a monomer whose homopolymers have the ability to absorb water. The term is not intended to include monomers merely because they have a hydrophilic group. A monomer is "hydrophilic" only if its homopolymer absorbs water.

The term "strengthening monomer" as used here relates to a monomer which can be polymerized with hydrophilic monomers in order to provide polymeric materials with improved physical properties, particularly tear and tensile strength. It is understood that said additional hydrophilic monomer is defined as different from, or exclusive of, the strengthening monomer.

The strengthening monomer of this invention is 2HCHM. Previously, 2HCHM had been disclosed as a hydrophilic monomer to be copolymerized with a strengthening agent such as TBE ('622). Further investigation of this monomer shows that it is actually incapable of absorbing any significant amount of water and should therefore be considered hydrophobic.

The strengthening monomer of this invention is preferably present at 5 to 45 parts by weight of total monomeric components, more preferably at 7 to 35 parts by weight and still more preferably, at 15 to 35 parts by weight. Mechanical properties such as tear strength can be significantly improved by employing at least 5 parts by weight of the strengthening monomer. When a higher tear strength is desired, it is preferred that the strengthening monomer is included in at least 15 parts by weight of total monomeric components.

The monomeric mixtures from which the copolymers are prepared may include at least one hydrophilic monomer known in the art as useful for contact lens materials. The selection of hydrophilic monomers for use in this invention is not narrowly critical. Representative hydrophilic monomers include: unsaturated carboxylic acids, such as (meth) acrylic acids; (meth)acrylic substituted alcohols, vinyl lactams, and (meth)acrylamides (as used herein, the term "(meth)" indicates optional methyl substitution. Thus, a term such as "(meth)acrylate" designates both acrylates and methacrylates). Specific examples of hydrophilic monomers include methacrylamide, N-methylmethacrylamide, N,N-dimethylacrylamide, N,N-dimethylmethacrylamide, glyceryl methacrylate, N-(2-hydroxyethyl)methacrylamide, N-methacryloyl glycine; and (2-hydroxy-3-methacryloylpropyl)-4-methoxy phenylether. More preferred monomers are N,N-dimethylacrylamide, N-vinyl-2-pyrrolidone (NVP), and 2-hydroxyethyl methacrylate (HEMA), It is preferred that the hydrophilic monomer (a term which is meant to include mixtures of hydrophilic monomers) is included in the monomeric mixture at 50–95 parts by weight of total monomeric components, with 60–90 parts by weight being especially preferred. According to preferred embodiments, the monomeric mixture includes at least 60 parts by weight, and more preferably at least 65 parts by weight, of total hydrophilic monomeric components so that the resultant copolymer is predominantly hydrophilic and wettable for use as a contact lens material.

The monomeric mixture usually includes a crosslinking agent (a crosslinker being defined as a monomer having multiple polymerizable functionalities), although one of the hydrophilic monomers may function as the crosslinker. Crosslinking agents are known in the art, and representative crosslinking agents include allyl methacrylate and ethylene glycol dimethacrylate (EGDMA). For other acrylic-containing, vinyl-containing and/or styrene-containing hydrophilic monomers, crosslinkers such as methacryloxyethyl vinyl carbonate (HEMAVC), 4-vinylphenyl vinyl carbonate, and 4-vinylphenyl carbamate are used.

Minor amounts of a polymerization initiator may also be included. The initiator is preferably a free radical ultraviolet polymerization initiator such as benzoin methyl ether (BME). Other initiators are known in the art.

A diluent may be added to the monomeric components, wherein the diluent is defined as a substance which is substantially nonreactive with the monomers in the monomeric mixture. The diluent may be added to the monomeric mixture at 0 to 50 parts by weight, based on weight of monomeric components in the mixture, more preferably, at 5 to 40 parts by weight, with 10 to 30 parts by weight being more preferred. The diluent can serve to minimize any incompatibility of the components in the initial monomeric mixture and further alleviate any problems attributed to phase separation. Also, the diluent may lower the glass transition temperature of the reacting polymeric mixture which allows for a more efficient curing process. Water may be used as the diluent, or alternately, an organic diluent may be employed, including: monohydric alcohols, with $C_3$–$C_{10}$ straight-chained aliphatic monohydric alcohols, such as n-hexanol and n-nonanol, being especially preferred; diols, such as ethylene glycol; polyols, such as glycerin; ethers, such as dipropylene glycol and diethylene glycol monobutyl ether; ketones, such as methyl ethyl ketone; esters, such as methyl enanthate, ethylene carbonate and glyceryl triacetate; and hydrocarbons. Other suitable diluents will be apparent to a person of ordinary skill in the art.

An optional additive is a color additive or tint at minor amounts (0.006%). Many contact lens tints are known in the art.

An especially preferred class of copolymers is produced by polymerizing a mixture containing:

(a) 30 to 70 parts by weight of a hydrophilic monomer or mixture thereof;

(b) 10 to 40 parts by weight of 2-hydroxycyclohexyl methacrylate;

(c) 0.01 to 5 parts by weight of a suitable crosslinking monomer; and (d) 0.01 to 5 parts by weight of a polymerization initiator; wherein the amounts are based on 100 parts by weight of components (a), (b), (c), and (d). Optionally, a diluent is added to the mixture at 0 to 50 parts by weight per 100 parts by weight of components (a), (b), (c), and (d).

The present invention further includes a hydrogel shaped article in the form of a contact lens which is the hydrated polymerization product of the previously described monomeric mixtures. The copolymers of the present invention provide contact lenses which are hydrolytically stable, biologically compatible and optically clear. Hydrolytic stability indicates that the contact lenses do not undergo chemical degradation and maintain substantially the same water content over time.

While the strengthening agent of this invention is broadly applicable to use in hydrogels, it is particularly applicable to hydrogel materials for mid- to high-water contact lenses. Preferably, the hydrated contact lenses have a water content of about 40–90%, more preferably 50–80%, and still more preferably 55–70%. It is also preferred that the lenses have a tear strength of at least 3.0 g/mm thickness to prevent damage to the lens from handling.

Contact lenses of the present invention are made according to techniques well known by those of ordinary skill in the art.

Inclusion of 2HCHM provides copolymers which could not otherwise be used for contact lens applications. Copolymers consisting of N,N-dimethylacrylamide (DMA)/ethylene glycol dimethacrylate (EGDMA) combinations do not have enough strength to permit testing of physical properties while DMA/2HCHM/EGDMA exhibit good physical properties. See Examples 2 and 3, below. The strengthening monomer is compatible with a variety of hydrophilic monomers and its incorporation produces copolymers having improved mechanical properties.

The invention is further described by reference to the following examples, which are intended to be illustrative but not limiting of the present invention.

EXAMPLE 1

Synthesis of 2-HCHM 222.8 grams (g) cyclohexene oxide (Aldrich Chem. Co.), 390.8 g methacrylic acid (Rohm and Haas), 459.4 g triethylamine (Aldrich Chem. Co.), 0.24 g 2,5-diphenyl-1,4-benzoquinone (Aldrich Chem. Co.) and 0.24 g cuprous chloride (Aldrich Chem. Co.) were added under dry air to a 2 liter round bottom flask equipped with a stir bar, water condenser, heating mantle and electronic heating unit equipped with a thermocouple. The reaction was heated to 90° C. and monitored by gas chromotography (GC) for extent of reaction (the reaction was typically complete following a five hour reaction time-extent of reaction 90–95%). The unreacted methacrylic acid, triethylamine and cyclohexene epoxide was then removed by vacuum distillation at 90° C. using a 20 cm Vigreux column and distillation head. The reaction was then diluted with 1500 mL of pentane and washed two times with 300 mL of IN NaOH brine solution (prepared by combining an equal volume of 2N NaOH with a saturated brine solution) and two times with a 2N HCl solution. The organic layer was collected, dried over MgSO$_4$, and the pentane is removed using a rotoevaporator (40° C./approximately 30 mm of Hg). After the pentane was removed, the crude 2-HCHM was purified by short-path vacuum distillation (boiling point 100° C./0.2 mm Hg, 300 ppm of butylated hydroxy toluene was added as a polymerization inhibitor). The final yield of 2-HCHM was between 60% and 70% with a GC purity of 95% or greater.

EXAMPLES 2 AND 3

Comparative Examples A–C

A series of mixtures were prepared from N,N-dimethylacrylamide (DMA), 2-hydroxy cyclohexyl methacrylate (2HCHM), 2-hydroxyethyl methacrylate (HEMA) and a diluent. Examples 2, 3, A and C were prepared with glycerin while B was prepared with hexanol. The amounts of these components, with the percentages of the monomers in the composition are listed in Table 1. Additionally, the mixtures included ethylene glycol dimethacrylate (EGDMA) (0.34%), benzoin methyl ether (BME) (0.17%) and a color additive (0.006%). The resultant monomeric mixtures were cast between two silane-treated glass plates separated by Teflon™ gaskets having a thickness of about 0.2 mm and cured under ultraviolet light at room temperature for 2 hours. The cured films were removed from the glass plates and extracted with water, followed by hydration in buffered saline. The modulus of elasticity and tear strength of the hydrated films were measured following modified ASTM-D 1708 and ASTM-D 1938 methods.

The results are summarized in Table 1.

TABLE 1

|  | Example | | | | |
| --- | --- | --- | --- | --- | --- |
|  | 2 | 3 | A | B | C |
| % DMA | 50 | 55 | 15 | 20 | 20 |
| % HEMA | — | — | 70 | 65 | 65 |
| % 2HCHM | 35 | 30 | — | — | — |
| % Diluent | 15 | 15 | 15 | 15 | 15 |
| Modulus (g/mm$^2$) | 45 | 20 | 25 | 11 | 23 |
| Tear Strength (g/mm) | 10.0 | 4.0 | 2.9 | 3.7 | 2.7 |
| % Water | 66.1 | 72.6 | 55.2 | 64.9 | 61.9 |

These examples show that it is possible to achieve high water content materials with excellent mechanical properties. While a higher water content will give a higher oxygen permeability, one normally sees a dramatic effect in the tear strength. Examples 2 and 3 give high water content with low moduli and excellent tear strength. Example 2 and B have similar water content but example 2 exhibits a much better tear strength.

EXAMPLE 4

Contact Lens of the Invention

A monomer mixture containing 50% DMA, 35% 2HCHM, and 15% glycerin was prepared. To this mixture was added 0.34% EGDMA, 0.17% BME and 0.01% of a color additive. Samples of this mixture were injected onto a polypropylene concave mold section (for the anterior lens surface), and then covered with a convex polypropylene mold section (for the posterior lens surface). After pressing the molds together, the mold assemblies containing monomer mix were exposed to UV light for 30 minutes at room temperature. The molds were opened mechanically, the cured contact lenses were released from the mold section in warm water, and then the lenses were extracted with water and hydrated in buffered saline. The mechanical properties of the lens lots were evaluated following the general procedure of Example 1. The lenses possessed a modulus of 70 g/mm$^2$, a tensile strength 33 g/mm$^2$, a tear strength of 7.3 g/mm, 97% elongation and 61.6% water.

While certain preferred embodiments have been described, it is understood that the invention is not limited thereto and modifications and variations would be evident to a person of ordinary skill in the art.

We claim:

1. A hydrogel formed from the hydrated polymerization product of a monomer mixture comprising a hydrophilic monomer and a strengthening monomer, wherein the strengthening monomer consists of 2-hydroxycyclohexyl methacrylate.

2. A contact lens formed from the hydrogel polymerization product of a monomer mixture comprising a hydrophilic monomer, a crosslinker and a strengthening monomer, wherein the strengthening monomer consists of 2-hydroxycyclohexyl methacrylate.

3. A contact lens formed from the hydrogel polymerization product of a monomer mixture comprising N-vinyl pyrrolidone, 2-hydroxyethyl methacrylate, a crosslinker and 2-hydroxycyclohexyl methacrylate.

4. A contact lens formed from the hydrogel polymerization product of a monomer mixture comprising 15 to 20% N,N-dimethylacrylamide, 65 to 70% 2-hydroxyethyl methacrylate, a crosslinker and 2-hydroxycyclohexyl methacrylate.

5. A contact lens formed from the-hydrogel polymerization product of a monomer mixture comprising glyceryl methacrylate, 2-hydroxyethyl methacrylate, a crosslinker and 2-hydroxycyclohexyl methacrylate.

6. The hydrogel of claim 1 wherein the hydrophilic monomer is selected from the group consisting of N,N-dimethylacrylamide, N-vinyl-2-pyrrolidone, 2-hydroxyethyl methacrylate; N-(2-hydroxyethyl) methacrylamide; glyceryl methacrylate; N-methacryloyl glycine; (2-hydroxy-3-methacryloylpropyl)-4-methoxy phenylether and mixtures thereof.

7. The hydrogel of claim 1 wherein the monomer mixture contains about 5 to about 45 weight percent of 2-hydroxycyclohexyl methacrylate.

8. The hydrogel of claim 1 wherein the monomer mixture contains about 7 to about 35 weight percent of 2-hydroxycyclohexyl methacrylate.

9. The hydrogel of claim 1 wherein the monomer mixture contains about 15 to about 35 weight percent of 2-hydroxycyclohexyl methacrylate.

10. The hydrogel of claim 1 wherein the monomer mixture comprises N,N-dimethylacrylamide.

11. The hydrogel of claim 1 wherein the monomer mixture comprises 2-hydroxyethyl methacrylate.

12. The hydrogel of claim 1 wherein the monomer mixture comprises N-vinyl pyrrolidone.

13. The hydrogel of claim 1 wherein the monomer mixture comprises N-vinyl pyrrolidone and 2-hydroxyethyl methacrylate.

14. The hydrogel of claim 1 wherein the monomer mixture comprises N-vinyl pyrrolidone, 2-hydroxyethyl methacrylate, and a crosslinking agent.

15. The hydrogel of claim 14 wherein the crosslinking agent is methacryloxyethyl vinylcarbonate.

16. The hydrogel of claim 1 wherein the monomer mixture comprises N,N-dimethylacrylamide.

17. The hydrogel of claim 1 wherein the monomer mixture comprises 15 to 20% N,N-dimethylacrylamide and 65 to 70% of 2-hydroxyethyl methacrylate.

18. The hydrogel of claim 1 wherein the monomer mixture comprises glyceryl methacrylate.

19. The hydrogel of claim 1 wherein the monomer mixture comprises glyceryl methacrylate and 2-hydroxyethyl methacrylate.

20. The hydrogel of claim 1 wherein the monomer mixture further comprises a crosslinking agent.

21. The hydrogel of claim 20 wherein the monomer mixture comprises 2-hydroxyethyl methacrylate, N-vinyl pyrrolidone, and a crosslinking agent selected from the group consisting of allyl methacrylate and methacryloxyethyl vinylcarbonate.

22. The hydrogel of claim 1 wherein said monomer mixture further comprises a polymerization initiator.

23. The contact lens of claim 2 wherein the hydrophilic monomer is selected from the group consisting of N,N-dimethylacrylamide, N-vinyl-2-pyrrolidone, 2-hydroxyethyl methacrylate; N-(2-hydroxyethyl) methacrylamide; glyceryl methacrylate; N-methacryloyl glycine; (2-hydroxy-3-methacryloylpropyl)-4-methoxy phenylether and mixtures thereof.

24. The contact lens of claim 2 wherein the monomer mixture contains about 5 to about 45 weight percent of 2-hydroxycyclohexyl methacrylate.

25. The contact lens of claim 2 wherein the monomer mixture contains about 7 to about 35 weight percent of 2-hydroxycyclohexyl methacrylate.

26. The contact lens of claim 2 wherein the monomer mixture contains about 15 to about 35 weight percent of 2-hydroxycyclohexyl methacrylate.

27. The contact lens of claim 2 wherein the monomer mixture comprises N,N-dimethylacrylamide.

28. The contact lens of claim 2 wherein the monomer mixture comprises 2-hydroxyethyl methacrylate.

29. The contact lens of claim 2 wherein the monomer mixture comprises N-vinyl pyrrolidone.

30. The contact lens of claim 2 wherein the monomer mixture comprises N-vinyl pyrrolidone and 2-hydroxyethyl methacrylate.

31. The contact lens of claim 30 wherein the crosslinking agent is methacryloxyethyl vinylcarbonate.

32. The contact lens of claim 2 wherein the monomer mixture comprises glyceryl methacrylate.

33. The contact lens of claim 2 wherein the monomer mixture comprises 2-hydroxyethyl methacrylate, N-vinyl pyrrolidone, and a crosslinking agent selected from the group consisting of allyl methacrylate and methacryloxyethyl vinylcarbonate.

34. The contact lens of claim 2 wherein the mixture further comprises a polymerization initiator.

35. The contact lens of claim 2 wherein the contact lens has a water content of 40 to 90% water.

36. The contact lens of claim 35 wherein the contact lens has a water content of 50 to 80% water.

37. The contact lens of claim 36 wherein the contact lens has a water content of 55 to 70% water.

* * * * *